United States Patent
Clech et al.

[11] Patent Number: 5,712,952
[45] Date of Patent: Jan. 27, 1998

[54] BOILER FOR COFFEE MACHINE OF THE ESPRESSO TYPE

[75] Inventors: Jean-René Clech, Saint Germain du Corbeis; Francis Landais, deceased, late of Chevauer, by Pierre Chevalier, administrator; Joël Landais, Conde sur Sarthe, all of France

[73] Assignee: Moulinex S.A., Bagnolet, France

[21] Appl. No.: 423,856

[22] Filed: Apr. 18, 1995

[30] Foreign Application Priority Data

Apr. 19, 1994 [FR] France .................. 94 04665

[51] Int. Cl.⁶ .................................. F24H 1/18
[52] U.S. Cl. .................. 392/458; 392/444; 392/459; 219/424
[58] Field of Search ............... 392/479, 441, 392/458, 459, 501, 442, 443, 444; 219/424, 536, 546, 535, 436

[56] References Cited

U.S. PATENT DOCUMENTS

| 2,748,252 | 5/1956 | Williams et al. | 392/459 |
| 3,064,112 | 11/1962 | Hanzel | 219/436 |
| 3,170,193 | 2/1965 | Fike | 219/535 |
| 3,648,659 | 3/1972 | Jones | 392/442 |
| 3,873,810 | 3/1975 | Larson | 219/535 |
| 4,106,179 | 8/1978 | Bleckmann | 219/536 |

FOREIGN PATENT DOCUMENTS 622041 11/1994 European Pat. Off. .

*Primary Examiner*—Tu B. Hoang
*Attorney, Agent, or Firm*—Young & Thompson

[57] ABSTRACT

A boiler for an espresso coffee maker comprises a metallic body (12) comprising a cover (15) with a peripheral flange (16) and a cup (18) connected in sealed fashion to the cover (15). A downwardly-extending water supply tube (26) extends through the cover. An electric heating resistance (24) is provided. A vertical water outlet conduit (32) opens through the bottom of the cup (18), and a valve (39) is disposed in the conduit (32) and opens only when a certain pressure threshold is reached. The peripheral flange (16) of the cover (15) of the body (12) is shaped as a gutter (22) in which is positioned in intimate thermal connection the electric heating resistance (24).

8 Claims, 1 Drawing Sheet

BOILER FOR COFFEE MACHINE OF THE ESPRESSO TYPE

BACKGROUND OF THE INVENTION

The present invention relates to a boiler for a coffee machine of the "espresso" type, comprising a metallic body which defines a chamber and which comprises an upper portion forming a cover with a peripheral flange and a lower part forming a cup which is connected in a sealed manner to the peripheral flange of the cover, a supply tube for water which is mounted to be immersed in the chamber and which is secured to the cover of the body and which is connected to an external supply pump, an electric heating resistance adapted to heat the water admitted into the chamber by said tube, an outlet conduit for water which is disposed vertically within the chamber and is secured to the bottom of the cup of the body and whose lower end opens from the bottom of the cup, and a valve which is disposed in the outlet conduit for the water and which is adapted to permit the flow of hot water from said conduit only when the pressure of the water in the chamber exceeds a given threshold.

In known boilers of this type, used in "espresso" coffee makers, the cover and the cup of the body of the boiler are generally each formed by stamping out sheet steel, and the heating resistance is in the form of a coil which is immersed within the chamber surrounding the water supply tube and the outlet conduit of the water, and which is connected to electrical connections each passing through the upper wall of the cover of the body of the boiler. The mounting of such an immersed electric resistance is particularly difficult and time consuming, which increases considerably the cost of production of the boiler. Moreover, this immersed resistance is always subject to solids deposit, impairing the good operation of the boiler.

SUMMARY OF THE INVENTION

The invention has for its object to overcome these drawbacks and to provide a boiler for an "espresso" coffee maker, of the type set forth above, which will be reliable and economical with a particularly easy mounting of the heating resistance.

According to the invention, the peripheral flange of the cover of the body is shaped like a gutter in which is disposed in intimate heat exchange relation the electric heating resistance.

Thus, the invention takes advantage of the production by stamping of the cover of the metallic body of the boiler to form at low cost the peripheral gutter and therein to position in a simple manner the heating resistance, which is therefore in intimate contact with the external periphery of the body of the boiler, at the base of the cover of said body, whilst obtaining very good direct thermal conduction between the heating resistance and the body of the boiler. Moreover, such mounting simplicity of the heating resistance is well adapted to automated mass production.

According to another preferable characteristic of the invention, the cover of the body is of a bimetallic material of good thermal conductivity, while the cup of the body is of stainless steel. The use of a bimetallic material, such as preferably stainless steel and aluminum, constituting among other things the peripheral gutter of the cover in which is received the heating resistance, permits obtaining an excellent thermal conduction between the heating resistance and the body of the boiler and hence producing hot water at an ideal temperature to obtain very good coffee.

BRIEF DESCRIPTION OF THE DRAWINGS

The characteristics and advantages of the invention will become further apparent from the description which follows, by way of non-limiting example, with reference to the accompanying drawing, in which the single FIGURE is a view in vertical cross section of a boiler for an "espresso" coffee maker according to the invention.

DESCRIPTION OF THE PREFERRED EMBODIMENT

Figure 1:
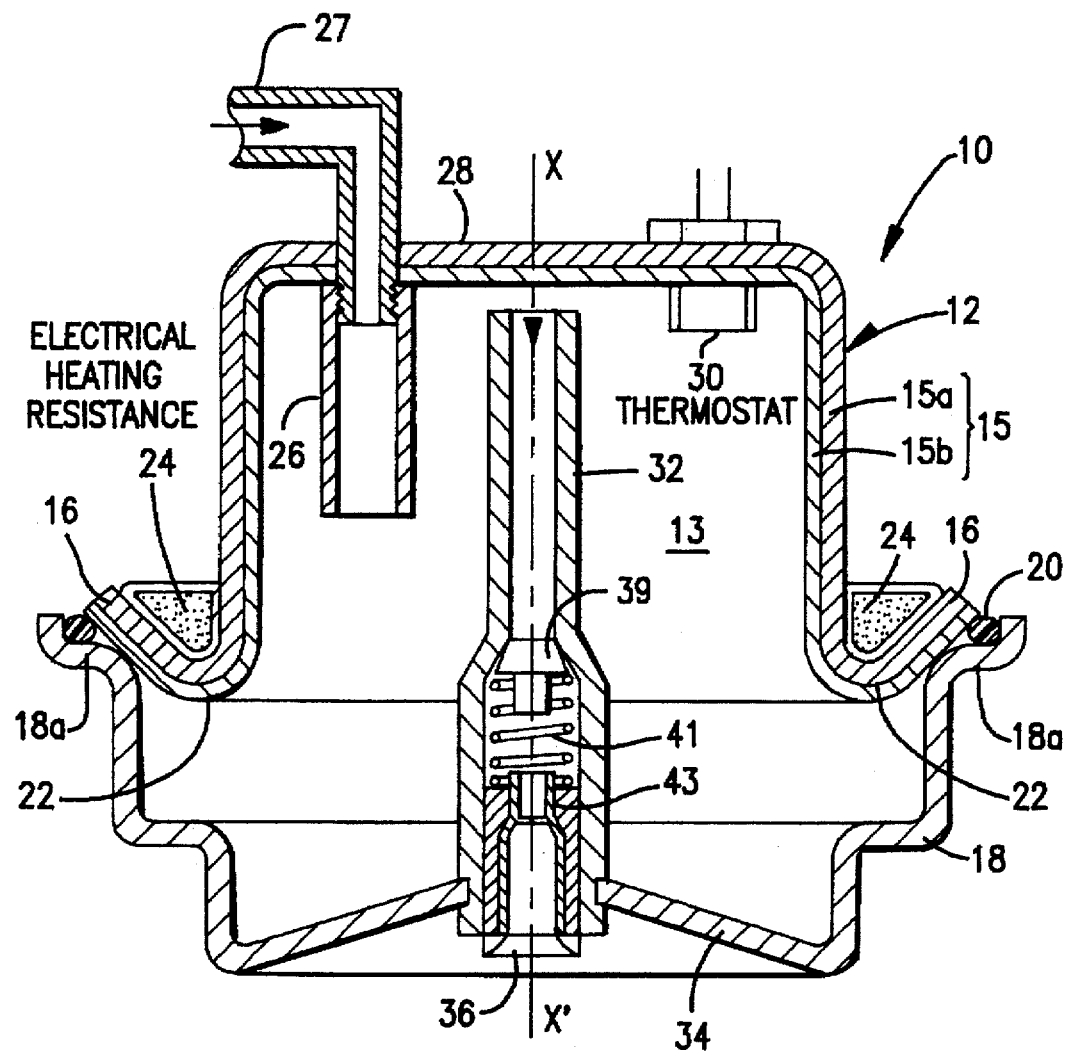

In the embodiment shown in the FIGURE, there is designated at 10 a boiler according to the invention and adapted to be mounted on a coffee machine of the "espresso" type. This boiler 10 comprises a metallic body 12, with a vertical axis of symmetry XX', delimiting a water chamber 13 of small volume and comprising an upper portion forming a cylindrical cover 15 with a peripheral flange 16, in thin stamped sheet steel, and a lower portion forming a cup 18, also of thin stamped sheet steel, whose upper edge 18a is connected to the flange 16 of the cover by any suitable assembly process, such as for example force fitting. An external sealing joint 20 is mounted gripped between the respective ends of the flange 16 of the cover 15 and of the edge 18a of the cup 18 of the body of the boiler.

According to the invention, the peripheral flange 16 of the cover 15 of the body of the boiler is shaped as a gutter, designated 22 in the FIGURE, in which is disposed in intimate thermal connection an electric heating resistance 24 adapted to heat the water admitted into the chamber 13 and in this instance having the form of an armored tubular resistance, initially of round or oval cross section. By its emplacement at the base of the cover 15 of the body of the boiler, the heating resistance 24 ensures homogeneous temperature of the water by natural mixing.

In the embodiment shown in the FIGURE, the heating resistance 24, once positioned in the gutter 22, is fixed by crimping in the gutter, thereby permitting obtaining a very good mechanical and thermal contact between the heating resistance 24 and the body 12 of the boiler.

According to a modification, not shown, the heating resistance 24 is secured by welding in the gutter 22.

As shown in the FIGURE, the boiler 10 comprises moreover a vertical supply tube 26 for water which is mounted to be immersed in the chamber 13, over a short depth within the latter, and which is disposed laterally relative to the axis XX' of the body 12 of the boiler. This tube 26 is connected to an external supply pump (not shown) via an elbowed tube 27 passing through the upper wall 28 of cover 15; in this example, the tube 26 is assembled on the elbowed tube 27 by means of a screw-threaded securement.

There is shown schematically at 30 in the FIGURE a thermostat, whose structure is known per se, which is set in the upper wall 28 of the cover 15, on the side opposite the water supply tube 26 relative to the axis XX' of the body 12, and which is adapted to control the temperature of the water admitted into the chamber 13 through the tube 26.

The boiler 10 also comprises a water outlet conduit 32 which is disposed vertically within the chamber 13 along the axis XX' of the body 12 and which passes through the bottom 34 of the cup 18 being fixed thereto by any suitable securement means. The conduit 32 has at its lower end an outlet 36 serving as an outlet orifice below which is disposed a filter carrier (not shown) mounted in a manner known per se on the "espresso" coffee maker and containing a quantity of ground coffee. The upper end 37 of this conduit 32 is located adjacent the upper wall 28 of the cover 15 of the body of the boiler.

Within the water outlet conduit 32 is disposed a conical valve or clapper 39 whose seat is formed by an internal conical section of the conduit 32 and which is adapted to permit the flow of hot water through the conduit only when the pressure of the water in the chamber 13 exceeds a given threshold. To this end, a compression spring 41 is mounted in bearing relationship between the valve 39 and a tubular cylindrical member 43 which is mounted coaxially within the conduit 32 and whose lower end opens directly into the outlet orifice 36 of the conduit 32. Preferably, the tubular member 43 is in the form of a perforated screw comprising a helical peripheral thread serving on the one hand for its securement in the conduit 32, and on the other hand for the adjustment of the compression of spring 41.

As mentioned above, the cover 15 and the cup 18 of the body 12 of the boiler are pieces of thin stamped steel, for example of the same thickness of 1.5 millimeter. According to one characteristic of the invention, the cup 18 is of stainless steel, while the cover 15 is itself of a bimetallic material of high thermal conductivity, such as aluminum and stainless steel, obtained by a conventional laminating technique. As shown in the FIGURE, the cover 15 has for this purpose an external surface 15a of aluminum, for example of a thickness equal to 1 millimeter, in mechanical and thermal contact with the heating resistance 24, and an internal surface 15b of stainless steel, for example of a thickness of 0.5 millimeter, in thermal contact with the water admitted into the chamber 13.

The use of this bimetallic material, and particularly aluminum, constituting the cover 15 of the body of the boiler, permits ensuring excellent thermal conductivity, on the one hand, between the heating resistance 24 and the body 12 so as rapidly to obtain hot water, and on the other hand, between the heating resistance 24, the body 12 and the suitable thermostat 30 so as to have cutting off and restarting, of the thermostat which takes place at an ideal temperature for obtaining good coffee.

The placement of the heating resistance 24 practically in the medial region of the chamber 13, below the level of the outlet of the tube 26 and at a distance from the thermostat 30, ensures homogeneous temperature of the water circulating within the chamber 13.

Moreover, the use of stainless steel as an internal cladding 15b of the cover 15 of the body of the boiler permits avoiding any migration of aluminum into the water which, as is well known, gives rise to the risk beyond a certain diffused quantity of seriously injuring the health of the consumer.

The operation of the boiler 10 for an "espresso" coffee maker according to the invention and described above is as follows.

The pump connected to the water inlet tube 27 injects cold water under pressure through the vertical supply tube 26 and, simultaneously, the electrical resistance 24 is supplied so as to heat the water admitted into the chamber 13. When the chamber 13 is full of water to a level above that of the upper end 37 of the vertical outlet conduit 32 and when the temperature of the water is sufficiently high, the pressure prevailing in the chamber 13 moves the valve 39 from its seat, compressing the spring 41, to let pass hot water which then leaves the boiler by the outlet orifice 36 so as to reach the ground coffee contained in the filter carrier of the "espresso" coffee maker.

We claim:

1. In a boiler for an espresso coffee machine, comprising a metallic body (12) which defines a chamber (13) and which comprises an upper portion forming a cover (15) with a peripheral flange (16) and a lower portion forming a cup (18) which is connected in a sealed manner to the peripheral flange (16) of the cover, a water supply tube (26) which is mounted on the cover (15) to extend down into the chamber (13), an electric heating resistance (24) adapted to heat the water admitted into the chamber (13) by said tube (26), a water outlet conduit (32) which is disposed vertically in the chamber (13) secured to the bottom (34) of the cup (18) of the body (12) and whose lower end opens through the bottom (34) of the cup (18), and a valve (39) which is disposed in the water outlet conduit (32) and which is adapted to permit the flow of hot water from said conduit (32) only when the pressure of the water in the chamber (13) exceeds a given threshold; the improvement wherein the peripheral flange (16) of the cover (15) of the body (12) is shaped as an upwardly and outwardly directed gutter (22) in which is positioned in intimate thermal connection the electric heating resistance (24) outside the cover, said gutter (22) having an outer surface contacting an inner surface of said cup (18).

2. Boiler according to claim 1, wherein the electric heating resistance (24) is crimped into the gutter (22).

3. Boiler according to claim 1, wherein the electric heating resistance (24) is welded in the gutter (22).

4. Boiler according to claim 1, wherein the cover (15) and the cup (18) of the body (12) are pieces of thin stamped steel, the cover (15) of the body being a bimetallic material of good thermal conductivity, while the cup (18) of the body is of stainless steel.

5. Boiler according to claim 4, wherein the bimetallic material is comprised of aluminum and stainless steel, the aluminum constituting the external surface (15a) of the cover (15) of the body.

6. Boiler according to claim 4, wherein the bimetallic material is produced by lamination.

7. Boiler according to claim 1, wherein the body (12) has a vertical axis (XX') of symmetry, the vertical water outlet conduit (32) is coaxial with said axis (XX') of said body (12), while the water supply tube (26) extends vertically down into the chamber (13), over a short depth of said chamber, from an upper wall (28) of the cover (15) of the body, the upper end (37) of said water outlet conduit (32) being located adjacent the upper wall (28) of the cover (15) of the body.

8. Boiler according to claim 1, wherein the electric heating resistance (24) is an armored tubular resistance.

* * * * *